(12) United States Patent
Conklin et al.

(10) Patent No.: US 8,499,144 B2
(45) Date of Patent: Jul. 30, 2013

(54) UPDATING SETTINGS OF A PROCESSOR CORE CONCURRENTLY TO THE OPERATION OF A MULTI CORE PROCESSOR SYSTEM

(75) Inventors: Christopher R. Conklin, Stone Ridge, NY (US); Michael F. Fee, Cold Spring, NY (US); Adolf Martens, Weil im Schoenbuch (DE); Walter Niklaus, Stuttgart (DE); Scott B. Swaney, Germantown, NY (US); Tobias Webel, Schwaebisch-Gmuend (DE)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 12/955,283

(22) Filed: Nov. 29, 2010

(65) Prior Publication Data

US 2011/0138167 A1    Jun. 9, 2011

(30) Foreign Application Priority Data

Dec. 7, 2009  (EP) .................................... 09178158

(51) Int. Cl.
*G06F 15/177* (2006.01)

(52) U.S. Cl.
USPC ......................................................... 713/100

(58) Field of Classification Search
USPC ............................................................ 713/100
See application file for complete search history.

(56) References Cited

U.S. PATENT DOCUMENTS

| 7,568,138 | B2 | 7/2009 | Martens et al. |
| 7,765,513 | B2 * | 7/2010 | Roesner et al. ............... 716/102 |
| 7,975,068 | B2 * | 7/2011 | Schlansker et al. ........... 709/238 |
| 2008/0028266 | A1 | 1/2008 | Martens et al. |
| 2008/0235454 | A1 * | 9/2008 | Duron et al. .................. 711/128 |

* cited by examiner

*Primary Examiner* — Kim Huynh
*Assistant Examiner* — Eric Chang
(74) *Attorney, Agent, or Firm* — Matthew J. Bussan

(57) ABSTRACT

The present invention provides an improved method for updating the settings of a processor or a processor core, respectively, concurrently to the operation of the respective processor system in which the processor or processor core, respectively, is running. This enables the insertion of new scan chain data and thus enabling the modification of the hardware characteristics of the processor.

19 Claims, 7 Drawing Sheets

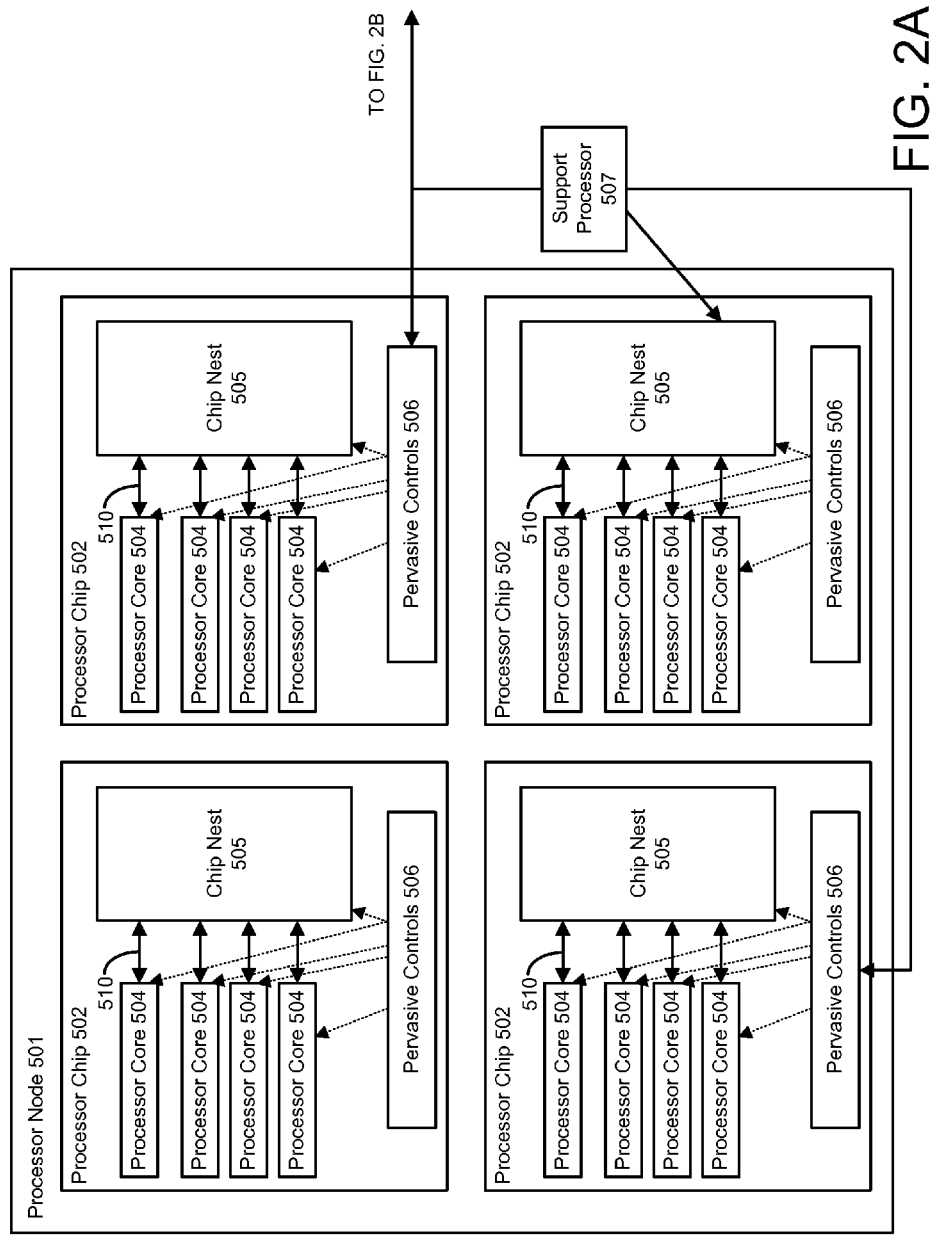

UPDATING SETTINGS OF A PROCESSOR CORE CONCURRENTLY TO THE OPERATION OF A MULTI CORE PROCESSOR SYSTEM

1. BACKGROUND OF THE INVENTION

1.1. Field of the Invention

The present invention relates to the field of hardware settings in multiprocessor systems or in multiprocessor core systems. In particular, it relates to a method and respective system for updating scan chain settings of selected processors comprised of a multiprocessor system in cooperation with a support hardware or a service interface for said system, preferably comprising one or more support processors, which allow to insert new defect-free scan chain data to one or more processors, or processor cores, respectively.

1.2. Description of Related Art

In the context of this application the term "processor" is an abstraction that was first implemented as multiple chips, later-on as single chips, nowadays often as multiple cores on a single chip. Thus, for the sake of clearness, the term comprises all of said different meanings.

Prior art is described in the published US patent application US 2008/0028266 A1, and in U.S. Pat. No. 7,568,138 B2, which are incorporated by reference.

Figure 1A:
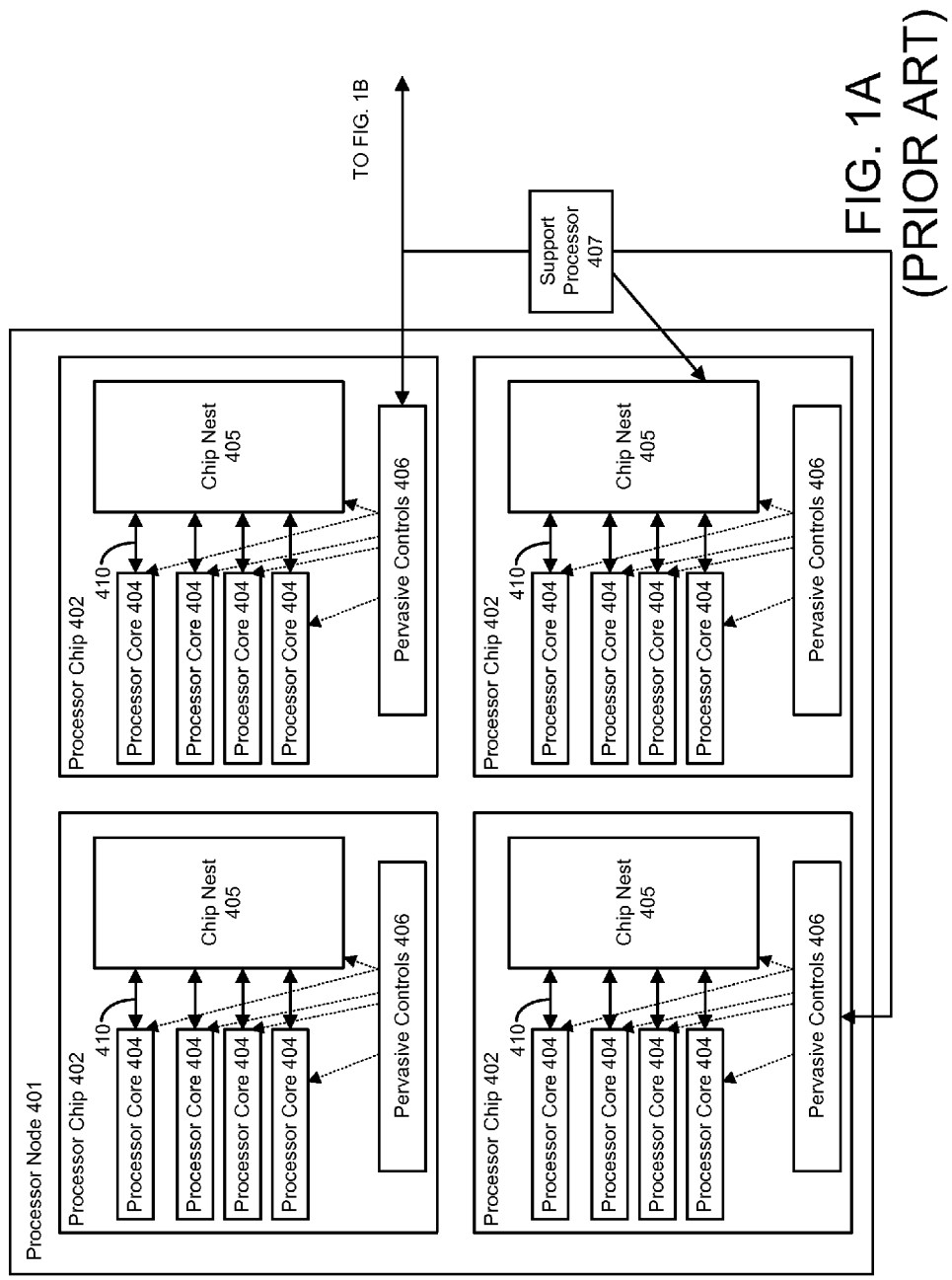
Figure 1B:
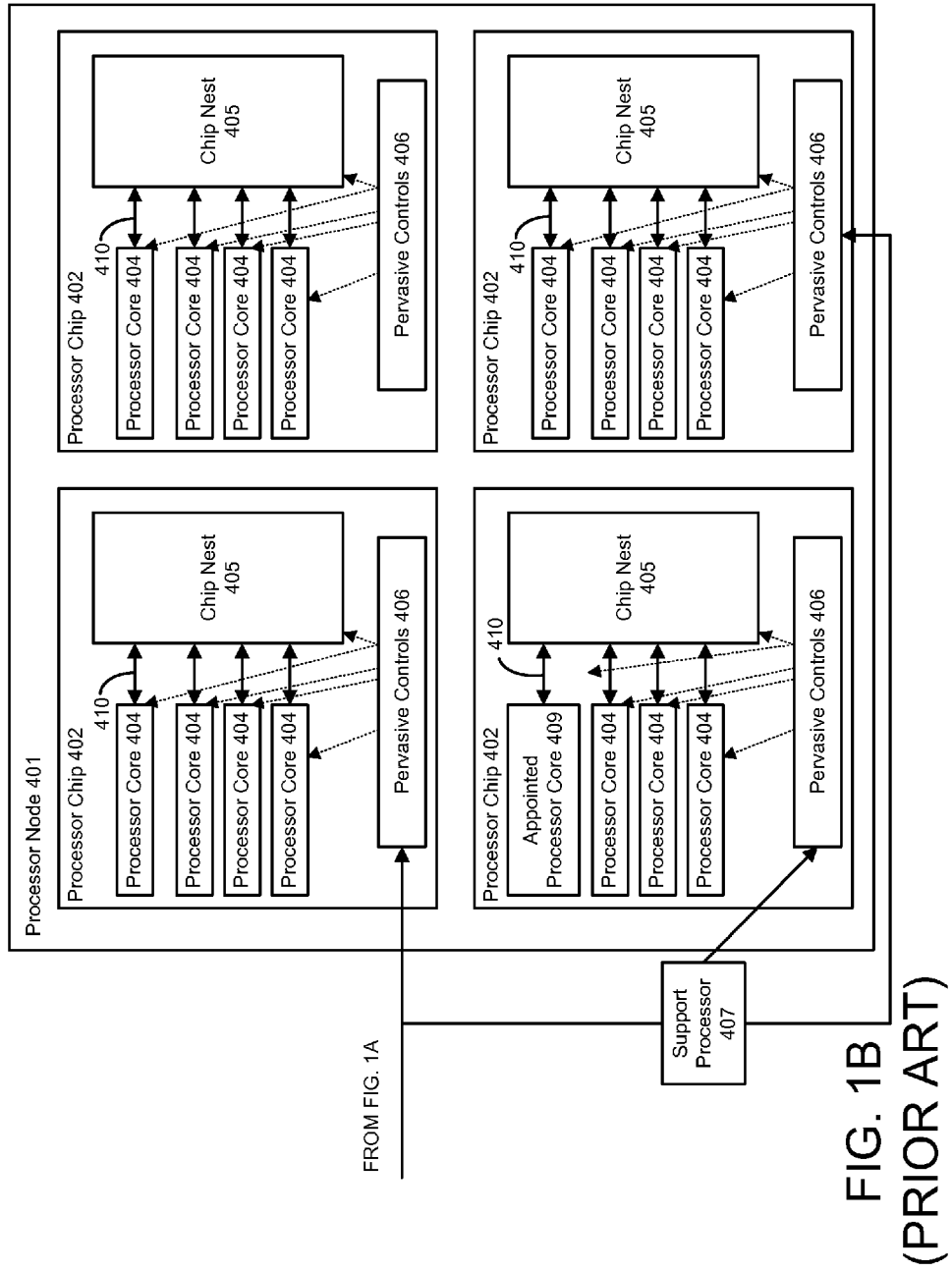

FIG. 1 illustrates the most basic structural components of a prior art hardware environment used for a prior art method.

FIG. 1 shows an exemplary prior art configuration of a symmetric multiprocessor consisting of one or multiple processor nodes 401. Each processor node holds one of more processor chips and each processor chip has one or more processor cores. Also located on each processor chip are components such as Cache, fabric bus, memory controller, etc., as described in more detail in U.S. Pat. No. 7,568,138 B2. In this document these components are referred to as the chip nest 405. Each processor core is connected to the chip nest via a set of interfaces that can be fenced; e.g., in the case that a processor core is stopped due to a hardware defect. This means that all outgoing lines are set to inactive.

Also located on each processor chip are the pervasive controls 406 which provide a scan access from the Support Processor 407 to all processor cores as well as to each chip nest. It also establishes a communication path between firmware running on the support processor and firmware running on the processor cores. One appointed processor core 409 is the communication (e.g., along communication line 410) counterpart for the Support Processor 407.

In order to update scan chain settings as mentioned before in above systems according to prior art, mechanisms are used in which a hardware reset sets the multiple chips into a functional state that allows for further initialization by a service processor. Without this initialization step a processor is not capable to run. The service processor sets up so-called "scan only" latches and starts the processor clock. As of today, new settings or modified settings of these initial values are exclusively done during the power-on-reset phase, which is disadvantageously disruptive for customer operations.

Further, in prior art, processors of the x86 processor architecture family may perform updates of the settings only in-band after the processor clocks have been started. This, however, requires a lot of dedicated hardware efforts and limits the scope of changes that can be applied.

2. SUMMARY AND ADVANTAGES OF THE INVENTION

The present invention provides an improved method for updating the settings of a processor or a processor core, respectively, concurrently to the operation of the respective processor system in which the processor or processor core, respectively, is running. This is achieved by the features stated in enclosed independent claims. Further advantageous arrangements and embodiments of the invention are set forth in the respective subclaims. Reference should now be made to the appended claims.

According to a broad aspect of the invention a method and respective system for updating settings of selected processors comprised of a multiprocessor system in cooperation with a support hardware (i.e., one or more support processors) is disclosed. This enables the insertion of new scan chain data and thus enabling the modification of the hardware characteristics of one or more processors.

The method includes the steps of:

a) during normal operation of said multi processor system updating a preselected spare processor—i.e., a stand-by processor—with said new scan chain data by inserting said data via said support hardware, b) moving the customer workload from an active processor, the setting of which is to be updated, to said updated spare processor in order to make the (former) active processor a new spare processor, c) updating respective scan chain data for said new spare processor, d) moving the workload from an active processor to said new spare processor and continue the steps a) to d) until all of said selected processors have been updated with new scan chain data.

By the new hardware settings, initial values can be installed during normal operation of the system without providing additional hardware for controlling special processor latches.

Further, instead of a processor, a processor core is updated in a respective multi core processor system according to the same principle as described before with reference to a processor.

Further, if a spare processor does not exist, a spare processor can be obtained by de-allocating a functional (non-spare) processor. The same is true for processor cores.

Thus, the present invention allows fixing hardware defects in the processor core without interrupting the normal operation of the computer system. Applying the fixes will appear as a concurrent patch of the computer system firmware.

The method of the present invention works if, in the multiple processor system or in the multiple processor cores system, there are control procedures implemented which enable the system to move user workload from one processor to another processor, or cores, respectively, and to fence the processors (cores) such that it is possible to insert, access and update scan chains. Fencing a processor in this context means to save its register contents, to make the register contents available at a second processor, and then to isolate the processor interfaces by switching them into a predefined inactive state.

Thus, the method makes use of a spare processor to apply updates sequentially to all processor cores. Basically, only one spare processor is required. When the method is applied to processor cores, a respective spare processor core is required. This spare processor is walked through the system updating the scan-init values on a respective spare processor.

Such firmware update resulting from the new scan-init values implies only a low risk of system failure because the current operational processors are not updated, but instead, only a spare processor is updated. As it is known from prior art swapping the operation between a functional processor and a spare processor does not imply severe problems. So, the robustness of the system is guaranteed during the firmware update.

With special reference to the prior art, in IBM® Corporation's System z10®, the existing functions which are already available are leveraged. Such existing functions are: non-spare/spare swapping, spare processor check stop, adding a spare processing unit to the existing configuration.

As a person skilled in the art will appreciate, the state machine of a processor core comprises four states and the following sequence of the four states:
1. Functional: processor core performing customer operations;
2. spare: processor core is hot standby;
3. fenced: processor core's interfaces are fenced off from nest;
4. stopped: processor core's clocks are stopped Assuming a selected processor core is a functional processor core before the update sequence has been started it is brought through the state 1 to 4 and reverse.

Further, the inventive method advantageously requires no downtime for the customer system, when an update of the initial values shall be performed. Only small performance degradation is required for a short time period. The inventive method also speeds up the hardware bringup because time consuming initialisation phases of the whole system can be avoided.

The method as described above may be implemented in prior art microcode or may be implemented as a hardware circuit which may be part of the design for an integrated circuit chip.

3. BRIEF DESCRIPTION OF THE DRAWINGS

Figure 2B:
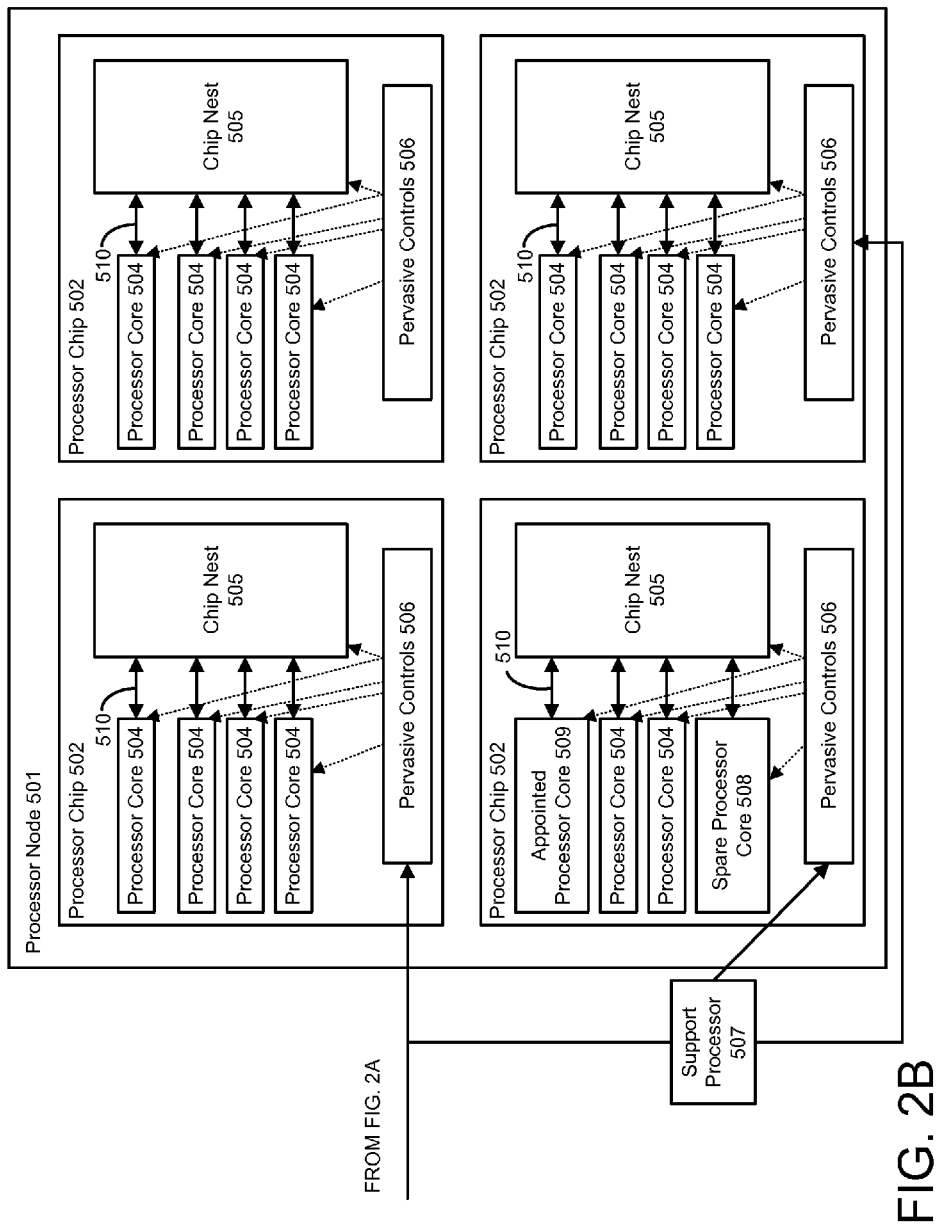
Figure 3A:
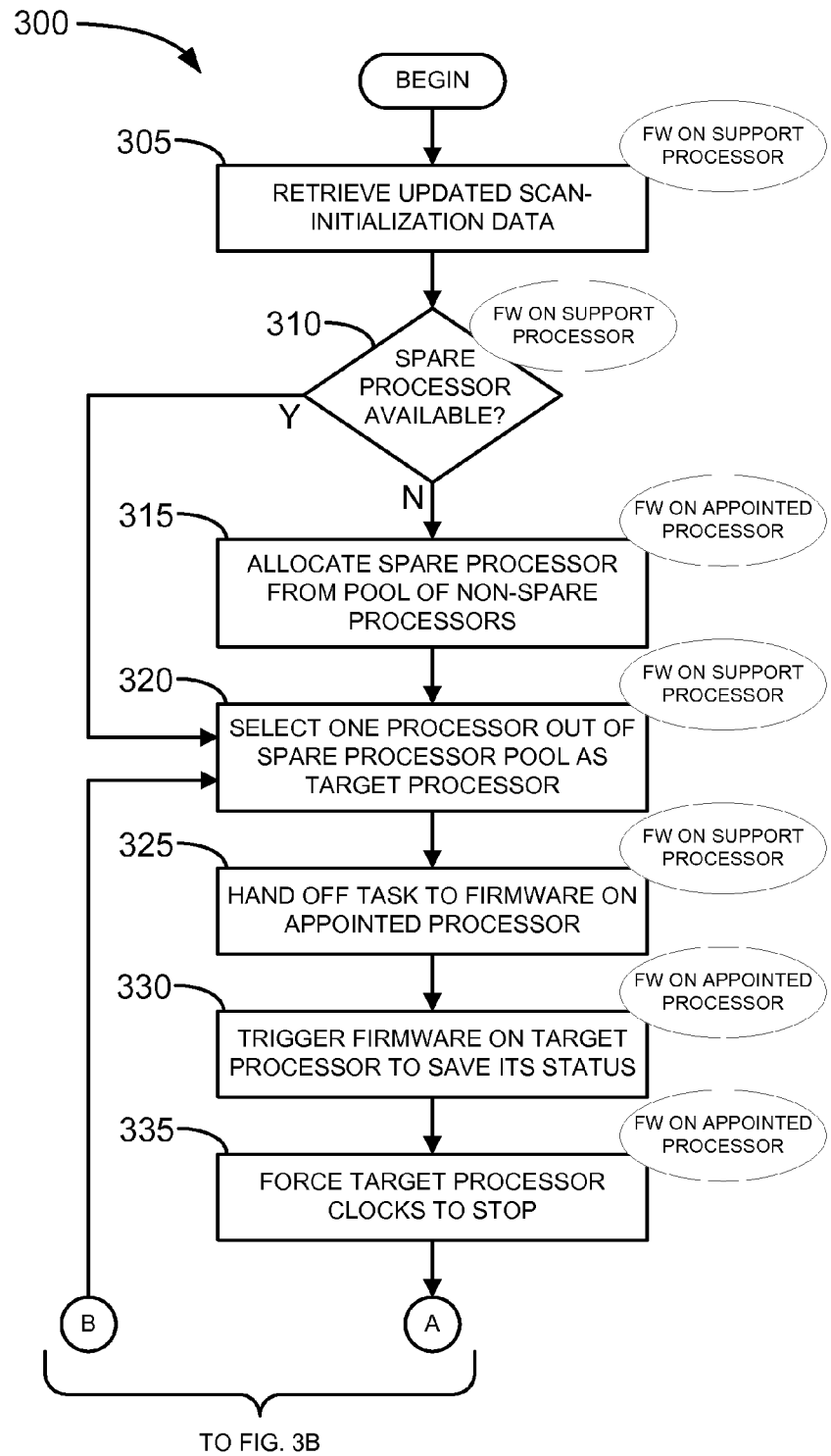
Figure 3B:
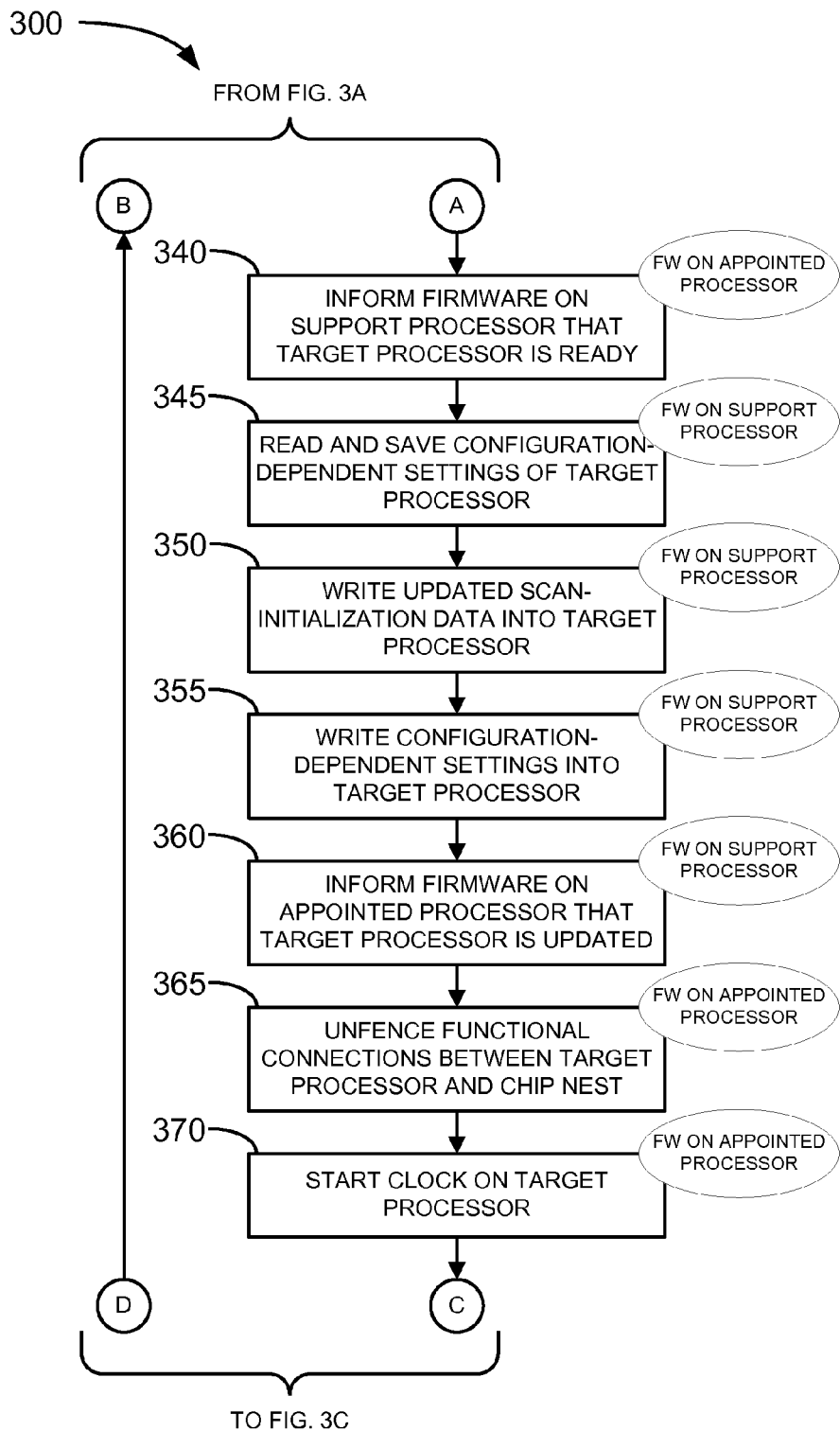
Figure 3C:
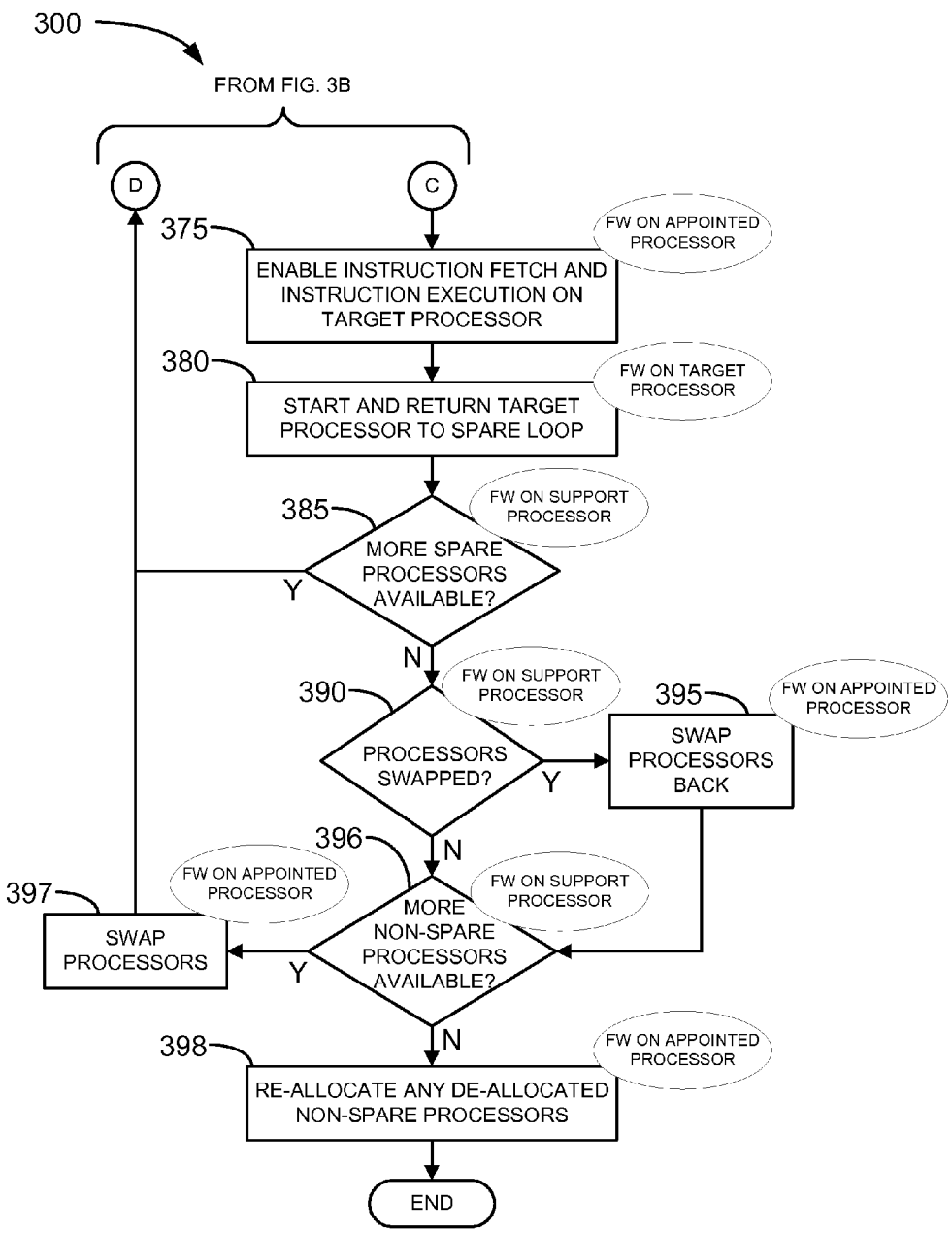

The present invention is illustrated by way of example and is not limited by the shape of the figures of the drawings in which:

FIG. 1 illustrates the most basic structural components of a prior art hardware environment used for a prior art method, FIG. 2 illustrates the most basic structural components of an inventive hardware and software environment used for a preferred embodiment of the inventive method, and FIG. 3 illustrates the control flow of the most important steps of a preferred embodiment of the inventive method.

4. DETAILED DESCRIPTION

FIG. 2 illustrates the most basic structural components of an inventive hardware environment used for an embodiment of the inventive method. In more detail, it depicts an exemplary configuration where two of the processor cores serve as spare processor cores and one is selected as the appointed processor core 509 which is the communication (e.g., along communication line 510) counterpart for the Support Processor 507, as mentioned above. That is, the appointed processor core 509 is one of the two spare processor cores. The other one of the two spare processor cores is denoted in FIG. 2 as spare processor core 508.

With general reference to the figures and with special reference now to FIG. 2, a prerequisite for the inventive method is that at least one processor core is not exploited for functional operation, so-called "production" but is used as a hot spare processor that can take over workload from any non-spare processor. In the case that no spare processor core is available, it is also possible that one is created by de-allocating a non-spare processor. The minimum number of processors or processor cores, respectively, is two.

A control flow of an embodiment of the inventive method 300 will be described next below:

Step 305: Firmware on the Support Processor 507 has retrieved an update to the initial values for the processor cores. This can be manually installed or automatically performed through the network the Support Processor is attached to.

Step 310: Firmware on the Support Processor 507 determines if a spare processor is available.

Step 315: If no spare is available it might be allocated from the pool of non-spare processors.

Step 320: Firmware on the Support Processor 507 selects one processor out of the spare processor pool 508 and appoints it as target processor as the one to get the update of the initial values.

Step 325: Firmware on the Support Processor 507 hands off the task to the Firmware on the appointed processor 509.

Step 330: Firmware on appointed Processor 509 triggers firmware on target processor to save its status into some reserved memory location. The status consists of the register contents that are required for a later restart of the target processor as a spare.

Step 335: Firmware on appointed Processor 509 forces target processor clocks to stop.

Step 340: Firmware on appointed Processor 509 informs Firmware on the Support Processor 507 that target processor is ready to receive initial value update.

Step 345: Firmware on the Support Processor 507 reads and saves configuration-dependent settings of target processor in case there are such settings. These settings are overwrites of the initial values as required for a specific configuration and can only be accessed from the Support Processor 507. So, they are not included in the registers saved in step 330. It should be noted that in general a general purpose computer system does not necessarily require this step because there are no such settings.

Step 350: Firmware on the Support Processor 507 writes new initial values into target processor.

Step 355: Firmware on the Support Processor 507 writes settings saved in step 345 into target processor.

Step 360: Firmware on the Support Processor 507 informs Firmware on appointed processor 509 about completion of the update.

Step 365: Firmware on appointed processor 509 unfences functional connections between target processor and the respective chip nest.

Step 370: Firmware on appointed processor 509 starts clocks on target processor.

Step 375: Firmware on appointed processor 509 enables instruction fetch and instruction execution on target processor.

Step 380: Firmware on target processor starts and returns to spare loop.

Step 385: Firmware on the Support Processor 507 determines if more spare processors are available that have not yet been updated. If yes, steps 320 to 380 are re-iterated until all spare processors have been updated.

Step 390: If a spare processor and a non-spare processor have been swapped before in 397 the firmware on the appointed processor 509 triggers to swap them back (step 395).

Step 396: Firmware on the Support Processor 507 determines if more non-spare processors are available that have not yet been updated. If this is the case, step 397 is executed; otherwise step 398.

Step 397: Firmware on appointed processor 509 triggers swap of non-spare processor and target spare. This means that the workloads on both processors are exchanged completely transparent to operating system and customer applications. Steps 320 to 397 are re-iterated until all non-spares have been updated (which is determined in step 396). Step 385 is a do not-care for these iterations because all spare processors are already updated.

Step 398: If non-spare processor has been de-allocated by Firmware on appointed processor 509 in step 315 it is re-allocated.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The invention claimed is:

1. A method for updating settings of selected processors a multiprocessor system in cooperation with support hardware comprising one or more support processor, the method comprising the steps of:
   a) during normal operation of the multiprocessor system updating a spare processor with new scan chain data by inserting updated scan-initialization values via the support hardware;
   b) swapping an active processor and the updated spare processor by moving workload from the active processor to the updated spare processor, wherein post-swap the active processor is a new spare processor, and wherein post-swap the updated spare processor is an updated active processor;
   c) updating the new spare processor with new scan chain data by inserting updated scan-initialization values via the support hardware; and
   d) swapping back the updated active processor and the updated new spare processor by moving the workload from the updated active processor to the updated new spare processor, wherein post-swapback the updated active processor is again the updated spare processor, and wherein post-swapback the updated new spare processor is an updated active processor, and continuing steps (b)-(d) for another processor until all of the selected processors have been updated with new scan chain data.

2. The method according to claim 1, wherein the selected processors are processor cores.

3. The method according to claim 2, wherein the multiprocessor system is a multiprocessor core system.

4. The method according to claim 1, wherein the step of during normal operation of the multiprocessor system updating a spare processor with new scan chain data by inserting updated scan-initialization values via the support hardware includes the step of fencing the preselected spare processor by saving contents of one or more registers of the spare processor and then isolating one or more interfaces of the spare processor by switching each of the one or more interfaces to a predefined inactive state.

5. The method according to claim 4, wherein the step of during normal operation of the multiprocessor system updating a spare processor with new scan chain data by inserting updated scan-initialization values via the support hardware includes the steps of stopping one or more clocks of the spare processor, then applying updated scan-initialization values to the spare processor, and then restarting the one or more clocks of the spare processor.

6. The method according to claim 1, wherein the step of updating the new spare processor with new scan chain data by inserting updated scan-initialization values via the support hardware includes the step of fencing the new spare processor by saving contents of one or more registers of the new spare processor and then isolating one or more interfaces of the new spare processor by switching each of the one or more interfaces to a predefined inactive state.

7. The method according to claim 6, wherein the step of updating the new spare processor with new scan chain data by inserting updated scan-initialization values via the support hardware includes the steps of stopping one or more clocks of the new spare processor, then applying updated scan-initialization values to the new spare processor, and then restarting the one or more clocks of the new spare processor.

8. A multi core processor system, comprising:
a support processor;
a processor node having a plurality of processor chips, wherein each processor chip includes a plurality of processor cores, a chip nest, and pervasive controls that provide scan access from the support processor to each of the plurality of cores of that processor chip;
firmware configured upon execution on the support processor and on the processor cores to update settings of selected processor cores among the plurality of processor cores of each of the plurality of processor chips, comprising the steps of:
a) during normal operation of the multi core processor system updating a spare processor core with new scan chain data by inserting updated scan-initialization values via the support processor;
b) swapping an active processor core and the updated spare processor core by moving workload from the active processor core to the updated spare processor core, wherein post-swap the active processor core is a new spare processor core, and wherein post-swap the updated spare processor core is an updated active processor core;
c) updating the new spare processor core with new scan chain data by inserting updated scan-initialization values via the support processor; and
d) swapping back the updated active processor core and the updated new spare processor core by moving the workload from the updated active processor core to the updated new spare processor core, wherein post-swapback the updated active processor core is again the updated spare processor core, and wherein post-swapback the updated new spare processor core is an updated active processor core, and continuing steps (b)-(d) for another processor core until all of the selected processor cores have been updated with new scan chain data.

9. The multi core processor system according to claim 8, wherein the step of during normal operation of the multi core processor system updating a spare processor core with new scan chain data by inserting updated scan-initialization values via the support processor includes the step of fencing the preselected spare processor core by saving contents of one or more registers of the spare processor core and then isolating one or more interfaces of the spare processor core by switching each of the one or more interfaces to a predefined inactive state.

10. The multi core processor system according to claim 9, wherein the step of during normal operation of the multi core processor system updating a spare processor core with new scan chain data by inserting updated scan-initialization values via the support processor includes the steps of stopping one or more clocks of the spare processor core, then applying updated scan-initialization values to the spare processor core, and then restarting the one or more clocks of the spare processor core.

11. The multi core processor system according to claim 8, wherein the step of updating the new spare processor core with new scan chain data by inserting updated scan-initialization values via the support processor includes the step of fencing the new spare processor core by saving contents of one or more registers of the new spare processor core and then isolating one or more interfaces of the new spare processor core by switching each of the one or more interfaces to a predefined inactive state.

12. The multi core processor system according to claim 11, wherein the step of updating the new spare processor core with new scan chain data by inserting updated scan-initialization values via the support processor includes the steps of stopping one or more clocks of the new spare processor core, then applying updated scan-initialization values to the new spare processor core, and then restarting the one or more clocks of the new spare processor core.

13. A computer program product, comprising:
a non-transitory computer readable storage medium; and program code stored on the computer readable storage medium and configured upon execution to update settings of selected processors of a multiprocessor system in cooperation with support hardware comprising one or more support processor, comprising the steps of:
a) during normal operation of the multiprocessor system updating a spare processor with new scan chain data by inserting updated scan-initialization values via the support hardware;
b) swapping an active processor and the updated spare processor by moving workload from the active processor to the updated spare processor, wherein post-swap the active processor is a new spare processor, and wherein post-swap the updated spare processor is an updated active processor;
c) updating the new spare processor with new scan chain data by inserting updated scan-initialization values via the support hardware; and
d) swapping back the updated active processor and the updated new spare processor by moving the workload from the updated active processor to the updated new spare processor, wherein post-swapback the updated active processor is again the updated spare processor, and wherein post-swapback the updated new spare processor is an updated active processor, and continuing steps (b)-(d) for another processor until all of the selected processors have been updated with new scan chain data.

14. The computer program product according to claim 13, wherein the selected processors are processor cores.

15. The computer program product according to claim 14, wherein the multiprocessor system is a multiprocessor core system.

16. The computer program product according to claim 13, wherein the step of during normal operation of the multiprocessor system updating a spare processor with new scan chain data by inserting updated scan-initialization values via the support hardware includes the step of fencing the preselected spare processor by saving contents of one or more registers of the spare processor and then isolating one or more interfaces of the spare processor by switching each of the one or more interfaces to a predefined inactive state.

17. The computer program product according to claim 16, wherein the step of during normal operation of the multiprocessor system updating a spare processor with new scan chain data by inserting updated scan-initialization values via the support hardware includes the steps of stopping one or more clocks of the spare processor, then applying updated scan-initialization values to the spare processor, and then restarting the one or more clocks of the spare processor.

18. The computer program product according to claim 13, wherein the step of updating the new spare processor with new scan chain data by inserting updated scan-initialization values via the support hardware includes the step of fencing the new spare processor by saving contents of one or more registers of the new spare processor and then isolating one or more interfaces of the new spare processor by switching each of the one or more interfaces to a predefined inactive state.

19. The computer program product according to claim 18, wherein the step of updating the new spare processor with new scan chain data by inserting updated scan-initialization values via the support hardware includes the steps of stopping one or more clocks of the new spare processor, then applying updated scan-initialization values to the new spare processor, and then restarting the one or more clocks of the new spare processor.

\* \* \* \* \*